United States Patent [19]

Pedain et al.

[11] 4,433,010

[45] Feb. 21, 1984

[54] PROCESS FOR PREPARING GLASS CONSTRUCTIONS

[75] Inventors: Josef Pedain; Wolfgang Wellner, both of Cologne; Klus König; Hermann Gruber, both of Leverkusen, all of Fed. Rep. of Germany

[73] Assignee: Bayer Aktiengesellschaft, Leverkusen, Fed. Rep. of Germany

[21] Appl. No.: 454,520

[22] Filed: Dec. 30, 1982

[30] Foreign Application Priority Data

Jan. 9, 1982 [DE] Fed. Rep. of Germany ....... 3200430

[51] Int. Cl.$^3$ .............................................. C03C 17/32
[52] U.S. Cl. .................................... 427/160; 427/163; 427/165; 427/169
[58] Field of Search ................. 427/160, 163, 165, 169

[56] References Cited

U.S. PATENT DOCUMENTS 3,640,967  2/1972  König et al. ........................ 260/77.5
4,153,594  5/1979  Wilson, Jr. ...................... 260/31.8 R

OTHER PUBLICATIONS

Adhäsion (1970) 8, pp. 287–290.

*Primary Examiner*—James R. Hoffman
*Attorney, Agent, or Firm*—Gene Harsh; Joseph C. Gil

[57] ABSTRACT

The instant invention is directed to a process for the preparation of glass constructions comprising applying to glass, compositions comprising
  (a) a polyisocyanate component and
  (b) a polyol component comprising at least one dihydroxy polyester carbonate with a molecular weight of from 800 to 3000 which is a reaction product of hexanediol-(1,6) with ε-caprolactone and/or ε-hydroxycaproic acid, in a molar ratio of hexanediol-(1,6) to ε-caprolactone and/or ε-hydroxycaproic acid of from 4:1 to 1:3, and diaryl carbonates, which reaction product is optionally present as a mixture with up to 40% by weight, based on the total quantity of said polyol component, of other polyols with molecular weights of from 62 to 4000, optionally containing ester groups, the quantities of the said components corresponding to an isocyanate index of from 80 to 130, or compositions comprising
  (c) an isocyanate prepolymer based on said polyols, optionally present in admixture with other polyisocyanates, and optionally
  (d) free- or blocked-diamine chain-lengthening agents.

6 Claims, No Drawings

PROCESS FOR PREPARING GLASS CONSTRUCTIONS

This invention relates to novel one-component or multi-component systems which are resistant to hydrolysis, based on organic polyisocyanates and selected polyhydroxyl compounds, for use as or for the preparation of composite materials which are resistant to chemicals and UV light for glass constructions.

BACKGROUND OF THE INVENTION

The use of sealing and coating materials with panes of insulating glass is becoming increasingly important in modern buildings. The most popular materials presently used for this purpose are polysulfide raw materials. These materials have shown very satisfactory long term adherence to glass (see, for example, "Adhäsion" (1970), 8, pages 287–290, in particular, page 290). Polysulfide materials do, however, have considerable disadvantages. When they are processed, strong odors are likely to occur and, due to the necessity of maintaining them within a particular pH during their hardening process, difficulties arise in their adaptation to the given manufacturing conditions. Moreover, the conventional use of heavy metal oxides such as lead oxide or manganese oxide, as hardeners requires very careful observance of the processing conditions if health hazards are to be avoided. These special handling requirements and the likelihood of mistakes and losses of these expensive binders increase already high building costs.

Attempts have, therefore, been made to use polyurethane binders for this purpose. Permanently-elastic sealing materials based on polyurethanes have already been successfully used in two-component processes and even in one-component processes (see, for example, U.S. Pat. No. 4,153,594) for the protection of buildings. However, for use as composite materials for glass constructions, conventional polyurethane-based sealing materials have not had satisfactory properties. These known materials have shown insufficient adherence to glass, particularly when sunlight strikes the contact surface between sealing material and glass, leading to a severe loss of adherence over time. Attempts to mitigate this problem by applying light absorbent primers, for example, primers containing carbon black, to the surface, before the sealing materials are applied have not been successful. The visual impression of the glass building components which have been sealed off in this manner is, of course, impaired by such a pigmentation.

Another reason for the lack of acceptance of these sealing materials lies in the fact that the polyurethane systems known in the art are also unsuitable for preventing the undesirable diffusion of water vapor into the internal space of the double glass construction. These conventional polyurethane sealing materials have, therefore, hardly achieved any measure of acceptance.

It was, therefore, an object of the present invention to provide novel composite materials based on polyurethanes, which would be able to be used either solvent-free or with only small quantities of solvent and would not have the above-mentioned disadvantages of the known polyurethane systems, for glass constructions.

This object has been achieved by the use of the systems according to the invention.

DESCRIPTION OF THE INVENTION

The present invention relates to the preparation of glass constructions comprising applying, to glass, a composition comprising a polyisocyanate component comprising at least one organic polyisocyanate and a polyol component, said polyisocyanate and total polyol component being present in quantities corresponding to an isocyanate index of from 80 to 130, and optionally, known auxiliary agents and additives. The polyol component comprises at least one dihydroxy polyester carbonate with a molecular weight of from 800 to 3000, comprising a reaction product of hexanediol-(1,6) with ε-caprolactone and/or ε-hydroxycaproic acid (in a molar ratio of hexanediol-(1,6):ε-caprolactone and/or ε-hydroxycaproic acid within the range of 4:1 to 1:3), and diaryl carbonates, optionally present as a mixture with up to 40% by weight, based on the total quantity of the component, of other polyols with molecular weights of from 62 to 4000, optionally containing ester groups.

The present invention also relates to the preparation of glass constructions comprising applying, to glass, a composition comprising an isocyanate prepolymer which has been obtained by the reaction of said polyol component with excess quantities of said polyisocyanate component, and which is optionally present as a mixture with up to about 30% by weight, based on the prepolymer, of organic polyisocyanates other than the polyisocyanate or polyisocyanates used for its preparation, and optionally up to a total of 30%, by weight, based on said isocyanate prepolymer, of diprimary aromatic diamines within the molecular weight range of from 108–400 and/or of chain-lengthening agents carrying two blocked amino groups which may be activated by moisture, said chain-lengthening agents being selected from the group consisting of bis-aldimines, bis-ketimines, bis-enamines and bis-oxazolidines, and optionally other known auxiliary agents and additives.

The polyisocyanate component according to the invention comprises at least one organic polyisocyanate of the type known in polyurethane chemistry, such as compounds corresponding to the formula:

wherein
Q denotes an aromatic hydrocarbon group with a total of 6 to 15 carbon atoms, optionally methyl-substituted or containing methylene bridges, an aliphatic hydrocarbon group having 4 to 18, preferably 6 to 10, carbon atoms, a cycloaliphatic hydrocarbon group having 6 to 15 carbon atoms, or a xylylene group, and
n denotes an integer from 2 to 5, preferably 2.

Examles of polyisocyanates suitable for purposes of the invention include tetramethylene diisocyanate, hexamethylene diisocyanate, 1,12-dodecane diisocyanate, cyclohexane-1,3- and -1,4-diisocyanate and any mixtures of these isomers, 1-isocyanato-3,3,5-trimethyl-5-isocyanato-methylcyclohexane (IPDI), perhydro-2,4'- and/or 4,4'-diphenyl methane diisocyanate. Additional examples include 1,3- and 1,4-phenylene diisocyanate, 2,4- and 2,6-tolylene diisocyanate and any mixtures of these isomers, diphenylmethane-2,4'- and/or 4,4'-diisocyanate, 3,2'- and/or 3,4'-diisocyanato-4-methyldiphenylmethane, naphthylene-1,5-diisocyanate, triphenylmethane-4,4',4''-triisocyanate, polyphenylpolymethylene polyisocyanates, such as are obtainable by aniline-formaldehyde condensation followed by phosgenation, as described, for example, in British Pat. Nos. 874,430 and 848,671. Polyisocyanates containing carbodiimide groups, as described in German Pat. No. 1,092,007, polyisocyanates containing allophanate groups, as described, for example, in British Pat. No. 994,890 and Belgium Pat. No. 761,626, polyisocyanates containing isocyanurate groups as described, for example, in U.S. Pat. No. 4,288,586, German Pat. Nos. 1,022,789, 1,222,067 and 1,027,394, German Offenlegungsschriften Nos. 1,929,034, 2,004,048 and 2,839,133 or in European Patent Specification No. 10,589 may also be used. Still further examples include polyisocyanates containing urethane groups, as described, for example, in Belgium Pat. No. 752,261 or in U.S. Pat. No. 3,394,164, polyisocyanates containing acrylated urea groups, according to German Pat. No. 1,230,778 and polyisocyanates containing biuret groups, as described, for example, in German Pat. No. 1,101,394, British Pat. No. 889,050 and French Pat. No. 7,017,514.

Preferred polyisocyanates for use according to the invention include IPDI, 4,4'-diisocyanato-dicyclohexylmethane, tris-(isocyanatohexyl)-biuret, optionally mixed with its higher homologues, as described, for example, in German Pat. No. 1,101,394, tris-(isocyanatohexyl)-isocyanurate, optionally mixed with its higher homologues, as described, for example, in European Patent Specification No. 10,589, and 4,4'-diisocyanatodiphenylmethane and mixtures thereof with 2,4'-diisocyanatodiphenylmethane, and/or its higher homologues, i.e., the known phosgenation products of aniline/formaldehyde condensates. Derivatives of 4,4'-diisocyanatodiphenylmethane, which have been modified, i.e., liquefied, by partial carbodiimidization of the isocyanate groups or by partial urethanization of the isocyanate groups, by a reaction with polypropylene glycols, having a maximum molecular weight of 700, are also particularly suitable for use according to the invention.

Of course, mixtures of these polyisocyanates may also be used according to the invention.

The total polyol component according to the invention comprises dihydroxypolyester carbonates with molecular weights of from 800 to 3000, preferably of from 1500 to 2500, calculated from the hydroxyl group content. These dihydroxypolyester carbonates are reaction products of hexanediol-(1,6) with ε-caprolactone and/or ε-hydroxycaproic acid, in a molar ratio of hexanediol-(1,6) to ε-caprolactone and/or ε-hydroxycaproic acid in the range of 4:1 to 1:3, preferably 2:1 to 1:2, and most preferably 1.2:1 to 1:1.2, and diarylcarbonates. The preparation of such dihydroxy polycarbonates is carried out by known methods (see, Houben-Weyl, XIV/2, page 48) and has been described, for example, in U.S. Pat. No. 3,640,967.

For this preparation, hexanediol-(1,6) is first reacted with ε-caprolactone (with ring opening) and/or with ε-hydroxycaproic acid (with the elimination of water) to form an ester glycol. This ester glycol is reacted with sub-equivalent quantities of diaryl carbonate to be converted, by heat, into the corresponding polyester-polycarbonate, containing OH end groups, with the elimination and removal of the corresponding phenol compound. The diaryl carbonate used for the preparation of the polyols, used in the process according to the invention, may be diphenyl carbonate, dinaphthyl carbonate, dicresyl carbonate or the like.

It is essential to the invention that the quantitative proportions mentioned above should be observed when preparing the dihydroxy polyester carbonates. When dihydroxy carbonates have been prepared from the hexanediol-(1,6) and ε-caprolactone and/or ε-hydroxycaproic acid starting components in different proportions, the resulting reaction products have too high a melting point for use according to the invention and result in polyurethanes which are insufficiently resistant to weathering.

The total polyol component which is essential to the invention may contain, in addition to the above-mentioned dihydroxy polyester carbonates, up to 40%, preferably up to 20%, by weight, of other polyhydroxyl compounds having aliphatically-bound hydroxyl groups, and optionally containing ester groups. These polyhydroxyl compounds have a calculated molecular weight of from 62 to 4000, preferably of from 800 to 3000. They are low molecular weight polyols, such as ethylene glycol, diethylene glycol, propylene glycol, butylene glycols, hexylene glycols, trimethylolpropane or glycerol or polyester polyols, within the specified molecular weight range, which may be synthesized, for example, from the above-mentioned low molecular weight polyols and polycarboxylic acids. From this class of substances, polyesters of hexanediol-(1,6) and adipic acid or polycaprolactones, which are obtained by ring-opening esterification of ε-caprolactone, or by the elimination of water from ε-hydroxycaproic acid, are particularly preferred.

In a first embodiment of the compound according to the invention, self-hardening systems, suitable as sealing materials for glass construction or for the preparation of sealing materials for glass constructions, are prepared by mixing the polyisocyanate and total polyol components, observing an isocyanate index of from 80 to 130, preferably of from 1.0 to 1.1 (isocyanate index=the number of isocyanate groups present in the mixture per 100 isocyanate-reactive groups (e.g., hydroxyl groups)). These mixtures may be used as sealing materials, without the addition of any further auxiliary agents or additives, or they may be used together with further auxiliary agents and additives. These optional auxiliary agents and additives may be added either to the mixtures of the components or to the individual components before they are mixed.

The auxiliary agents and additives used include, for example, solvents, e.g., ethyl acetate, butyl acetate, methyl ethyl ketone, methyl isobutyl ketone, ethylene glycol-monoethyl ether-acetate, toluene, xylene, petroleum spirit or any mixtures of these solvents. The process according to the invention, however, is preferably carried out solvent-free or with the use of only small quantities of solvent. The solvents may be used in a quantity of up to 40% by weight, preferably up to 20% by weight, based on the quantity of sealing material.

Other suitable auxiliary agents and additives include, for example, plasticizers, such as tricresyl phosphate, phthalic acid diesters or chloroparaffins; pigments and fillers, such as titanium oxide, barium sulfate, chalk and carbon black; catalysts, such as N,N-dimethylbenzylamine, N-methylmorpholine, lead octoate or dibutyl tin dilaurate; leveling agents; thickeners; stabilizers, such as substituted phenols; or bonding auxiliaries, such as organo functional silanes.

The moisture adhering to the fillers and pigments may be removed by preliminary drying or by the addition of water-absorbent substances, such as, for example, molecular sieve zeolites.

In a second embodiment of the use according to the invention, a prepolymer containing isocyanate groups is prepared in a first reaction step by the reaction of the polyisocyanate and total polyol described above. This reaction is carried out in a known manner, observing an isocyanate index of from 150 to 1,500, preferably of from 200 to 400, or by the reaction of the total polyol component with a large excess of the polyisocyanate component followed by the removal, optionally by distillation, of at least part of the unreacted excess of the polyisocyanate component. The resulting prepolymer containing isocyanate groups is used either alone, or in admixture with up to about 30% by weight, based on the prepolymer, of polyisocyanates of the type exemplified above which are different from the polyisocyanate used for the preparation of the prepolymer. The prepolymer component according to the invention thus consists of the above-mentioned isocyanate prepolymers or of mixtures thereof with other polyisocyanates of the type exemplified. It may be used as a moisture-hardening sealing material, either alone, or with the addition of the auxiliary agents and additives exemplified above.

According to a preferred variation of the alternative embodiment of the process according to the invention, however, the prepolymer component is mixed with the diamine component according to the invention before it is used. This diamine component comprises diprimary aromatic diamines in the molecular weight range of from 108 to 400 and/or blocked diamine chain-lengthening agents which are activated by moisture.

Examples of suitable diprimary aromatic diamines include p-phenylene diamine, 2,4- and/or 2,6-diamino toluene and 2,4'- and/or 4,4'-diaminodiphenylmethane, but they are preferably diprimary aromatic diamines, which have at least one alkyl substituent with 2 to 3 carbon atoms in an ortho-position to each amino group, and optionally also methyl substituents in other positions ortho to the amino groups. Typical examples of such preferred aromatic diamines include 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 3,5,3',5'-tetraisopropyl-4,4'-diaminodiphenylmethane, 3,5-diethyl-3',5'-diisopropyl-4,4'-diaminodiphenylmethane and any mixtures of such diamines.

The blocked diamine chain-lengthening agents include bis-oxazolidines of the type described, for example, in U.S. Pat. Nos. 3,661,923, 3,864,335 and 3,743,626 and, in particular, U.S. Pat. No. 4,002,601; or bis-aldimines, bis-ketimines or bis-enamines of the type described, for example, in German Auslegeschrift No. 1,520,139, German Offenlegungsschrift No. 2,125,247 or U.S. Pat. Nos. 3,267,078 or 3,715,338. Suitable blocked diamines generally have a molecular weight of from 196 to 600. The diamine component is preferably added to the isocyanate prepolymers in quantities of from 1 to 30%, preferably from 5 to 25%, by weight, based on the prepolymer component. The blocked diamine chain-lengthening agents mentioned as examples are most preferably used as the sole diamine component.

The resulting mixtures of the prepolymer and diamine components may also be used as sealing materials according to the invention, either with or without addition of the auxiliary agents and additives exemplified above. These sealing materials are mainly moisture-hardening materials, unless the diamine component contains a sufficient quantity of free diamines for hardening.

It is largely immaterial whether the process according to the invention is carried out according to the first or the second embodiment. The only essential factor is that the sealing material should contain the dihydroxypolyester carbonates which are an essential feature of the invention. The above-described range of variations of the process according to the invention does, however, enable the mechanical properties of the hardened sealing compounds finally obtained to be easily adjusted. In the second embodiment of the process according to the invention, hardening of the composite materials does, of course, depend upon the presence of atmospheric moisture. In the absence of atmospheric moisture, only the first embodiment should be used.

The composite materials according to the invention are eminently-suitable for the sealing of glass constructions, in particular, in the manufacture of insulating glass panes. Insulating glass consists of two or more panes held together at a desired distance by a hollow section, for example, of metal. In this arrangement, the panes and the section form an external joint into which the sealing material according to the invention is introduced, in a liquid or plastic form, and it then hardens within 1 to 48 hours, depending upon the chemical composition and catalysis. The whole construction is then held together by the sealing material.

It follows that the sealing material must satisfy stringent requirements as regards its mechanical and other properties. The sealing materials according to the invention ideally fulfill these requirements. The adherence between the glass pane and the joint is very good and undergoes virtually no change in the course of ageing and on exposure to light. The permeability to water vapor is so slight that the thaw point of the unit does not rise even after prolonged exposure to moisture. One characteristic which is particularly advantageous is that the sealing materials according to the invention retain their plasticity and elasticity even at low temperatures.

The composite materials according to the invention are also suitable for the manufacture of any type of glazing, for example, for the construction of automobiles, aircraft, railway coaches or buildings.

The examples which follow serve to illustrate the use according to the invention.

The following polyols are used in the Examples and in the Comparison Experiments.

Polyol A

A liquid polyester polycarbonate prepared from hexanediol-(1,6), ε-caprolactone and diphenyl carbonate, using these reactants in a molar ratio of 7,85:7,85:6,85 (average molecular weight about 2000, OH number 56),

Polyol B

The same as Polyol A, with a molar ratio of the reactants of 6,43:9,64:5,43 (average molecular weight about 2000, OH number 57).

Polyol C

Polyether of propylene oxide started on propylene glycol (average molecular weight about 2000, OH number 56).

Polyol D

Liquid polyester of adipic acid, butandeiol-(1,4), ethanediol and diethylene glycol (OH number 56, average molecular weight about 2000).

EXAMPLE 1

This example illustrates the high resistance to weathering of solvent-free, white sealing compound.

100 parts of Polyol B are ground up with 50 parts of titanium dioxide (of the rutile type) and 5 parts of zeolite powder in a ball mill. The resulting substance is then mixed with 20 parts of a solvent-free polyisocyanate which consists of a monomer-free biuret adduct of about 3 mol of hexamethylene diisocyanate and which has a viscosity of 10,000 mPa at 25° C., and an isocyanate content of 21.9%.

0.01 parts of dibutyl tin dilaurate is added to the mixture as catalyst before the mixture is worked up. The solvent-free, liquid coating compounds may be kept in a suitable state for processing for one hour at 23° C. without significant rise in viscosity.

The compound is used to coat a glass panel measuring 30×15 cm by pouring the compound on the panels. Smooth coatings forming bubble-free layers about 0.5 mm thick, which have a Shore A hardness of 75, are obtained after hardening. After the panels have been exposed to weathering outdoors for one year in a Florida climate, the surfaces of the panels show a slight loss of gloss but no discoloration, cracks or crazing.

EXAMPLE 2 (Comparison Experiment)

Example 1 is repeated but using Polyol C instead of Polyol B.

White coating-forming layers 0.5 mm in thickness, with a Shore A hardness of 60, are again obtained on glass panes.

After outdoor weathering for a year in a Florida climate, the coating is again found not to be discolored, but the surface shows severe signs of chalking and is cracked and heavily crazed and has partly become detached.

EXAMPLE 3

This example illustrates the preparation of a low-solvent composite material capable of being hardened by moisture, which is suitable for the constructional sealing of windscreens in the manufacture of automobiles.

An isocyanate prepolymer having an isocyanate content of 4.1% is prepared from 350 parts, by weight, of Polyol A and 100 parts, by weight, of 4,4'-diphenylmethane diisocyanate by stirring at 60° C. The prepolymer is diluted with 150 parts, by weight, of butyl benzyl phthalate and 40 parts, by weight, of xylene and mixed with 200 parts, by weight, of furnace black. Before the material is put to use, 4.5 parts, by weight, of tosyl isocyanate (an auxiliary agent for improving the storage stability of the paste), 4 parts, by weight, of γ-epoxypropyl-triethoxysilane (an auxiliary agent for improving adherence) and 0.6 parts, by weight, of dibutyl tin dilaurate (as catalyst) are added.

In this composition, the composite material has a stability in storage of at least three months if moisture is excluded. At 23° C. and 50% relative humidity, the composite material forms a continuous skin within 30 minutes and hardness in about 3 days to a Shore hardness A of about 70.

The composite material manifests very good properties of adherence on glass. The firm adherence is maintained even under exposure to UV light without requiring the aid of auxiliaries, such as black pigmented, special UV protective primers.

If, for comparison, a similar composite material based on Polyol C (polyether polyurethane) is used without additional UV protective primer, this sealing material becomes detached from the glass after 250 hours exposure to UV light.

EXAMPLE 4

This example illustrates the high grade properties of a composite material according to the invention, especially the high stability under exposure to ultraviolet light and compares them to those of a conventional polyurethane.

Two liquids prepolymers having an isocyanate content of about 4% are prepared by the reaction of 400 parts, by weight, of Polyol A or Polyol C with, in each case, 100 parts, by weight, of 1-isocyanato-3,3,5-trimethyl-5-isocyanato methyl cyclohexane at 100° C. for 6 hours. Two composite materials which have the following composition are prepared by mixing the resulting products with various additives:

Prepolymer (of Polyol A or Polyol C): 160 parts by weight

Diisodecylphthalate: 120 parts by weight

Chalk powder (with surface area 80 $m^2/g$): 220 parts by weight

γ-epoxypropyltriethoxysilane: 0.4 parts by weight 1-methyl-3,5-diethyl-2,4-diaminobenzene: 11 parts by weight Both solvent-free composite materials remain workable for approximately one hour. When applied to window glass, they show good adherence after hardening one day. The surfaces of adherence between glass and composite material are exposed to a 300 Watt Vitalux lamp from a distance of 30 cm.

The composite material based on Polyol C can easily be detached from the surface of the glass after 200 hours exposure to light. The composite material according to the invention based on Polyol A shows no change in its adherence after it has been exposed to light for 1000 hours.

The special suitability of this composite material according to the invention for sealing double glass panes is also confirmed by other measurements. The amount of water vapor permeating is 15 g per $m^2$ per day for a thickness of 1 mm, the μ-factor according to DIN 52 615 is 5300.

Due to this characteristic (firm adherence maintained under exposure to light and the low transmission of water vapor), the composite material is suitable for use in the construction of insulating glass.

EXAMPLE 5

This example illustrates the preparation of a moisture-hardening, low-solvent composite material which reacts with the aid of a latent hardener. The prepolymer of Polyol A and 1-isocyanato-3,3,5-trimethyl-5-isocyanato-methylcyclohexane described in Example 4 is used.

The following substances are mixed to prepare the composite material:

100 parts by weight of prepolymer 100 parts by weight of $C_{12}$–$C_{18}$-alkylarylsulfonic acid ester (as plasticizing agent)

5 parts by weight of a biuret polyisocyanate based on hexamethylene diisocyanate having an isocyanate content of 21.9%

10 parts by weight of petroleum hydrocarbons (hydrocarbon mixture with a boiling range of 140°–180° C.)

15 parts by weight of a silica dispersed as a powder having a surface area of 150 m²/g 3 parts by weight of oleic acid (as catalyst)

26 parts by weight of N,N'-bis-[2-isopropyl-1,3-oxazolidin-3-yl)-ethoxycarbonyl]-1,6-diaminohexane.

The mixture of components forms a one-component sealing compound which may be stored for several months and when exposed to air at 23° C. and 50% relative humidity forms a continuous skin within 10 minutes and hardens to an elastic material. This composite material is particularly suitable for sealing the expansion and connection joints in glass constructions.

EXAMPLE 6

In this example, a composite material according to the invention is compared with a polyurethane-based composite material which is not according to the invention.

100 parts, by weight, of Polyol A, Polyol C or Polyol D are mixed in each case with 14 parts, by weight, of a crude phosgenation product of an aniline/formaldehyde condensate containing 34% of 4,4'-diphenylmethane diisocyanate, 10% of 2,4'-diphenylmethane diisocyanate and 56% of higher nuclear tri- and polyisocyanates. The mixture is cast to form layers 10 mm thick which are left to harden and then used to produce test rods measuring 120×15×10 mm. These are sorted in test media for 10 days at 80° C. The change in weight is then measured.

| Product of | | Test Media | |
|---|---|---|---|
| Polyol | Water | 10% H$_2$SO$_4$ | 10% KOH |
| A | +3.7% | +1.3% | 0% |
| C | +6.5% | +8.7% | +3.8% |
| D | +10.3% | −54 | Test rod destroyed |

These results show that only the composite material according to the invention is suitable for the production of insulating glass seals.

These results are also confirmed by measurements of the impermeability to water vapor:

| Product of Polyol | μ-Factor Determined According to DIN 52 615 |
|---|---|
| A | 2100 |
| C | 850 |
| D | 630 |

EXAMPLE 7

The polyurethanes prepared in Example 6 are used for further investigations to demonstrate the advantages of the composite materials according to the invention.

The polyurethanes obtained from Polyol A and Polyol C are stored for 30 minutes at 180° C. and the change in properties is then tested.

| | Initial Value | Final Value |
|---|---|---|
| Polyurethanes from Polyol A, Example 6 | | |
| Shore Hardness A | 60 | 60 |
| Breaking strength DIN 53 455 | 3.1 N/mm² | 4 N/mm² |
| Elongation at break | 275% | 470% |
| DIN 53 455 Polyurethanes from Polyol C, Example 6 | | |
| Shore Hardness A | 30 | 0 |
| Breaking strength DIN 53 455 | 1.8 N/mm² | no longer measurable product, liquefied by heat |
| Elongation at break DIN 53 455 | 230% | |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the preparation of glass construction comprising applying, to glass, a composition comprising a polyisocyanate component comprising at least one organic polyisocyanate and a polyol component, in quantities corresponding to an isocyanate index of from 80 to 130, wherein said polyol component comprises at least one dihydroxy polyester carbonate having a molecular weight of from 800 to 3000 which constitutes a reaction product of a hexanediol-(1,6) with ε-caprolactone, ε-hydroxycaproic acid, or a combination of these materials, in a molar ratio of hexanediol-(1,6) to ε-caprolactone, ε-hydroxycaproic acid, or a combination of these materials in the range of from 4:1 to 1:3, and diarylcarbonates.

2. A process according to claim 1, characterized in that said polyol is present as a mixture with up to 40%, by weight, based on the total quantity of polyol present, of other polyols with molecular weights of from 62 to 4000.

3. A process according to claim 2, characterized in that the polyols with molecular weights of from 62 to 4000 contain ester groups.

4. A process for the preparation of glass constructions comprising applying to glass, a composition comprising an isocyanate prepolymer component which is a prepolymer comprising the reaction of a polyol component with excess quantities of a polyisocyanate component comprising at least one organic polyisocyanate, wherein said polyol component comprises at least one dihydroxy polyester carbonate having a molecular weight of from 800 to 3000 which constitutes a reaction product of a hexanediol-(1,6) with ε-caprolactone, ε-hydroxycaproic acid, or a combination of these materials, in a molar ratio of hexanediol-(1,6) to ε-caprolactone, ε-hydroxycaproic acid, or a combination of these materials in the range of from 4:1 to 1:3, and diarylcarbonates.

5. A process according to claim 4, characterized in that said isocyanate prepolymer component comprises said prepolymer in a mixture with up to about 30%, by weight, based on said prepolymer, of organic polyisocyanates other than the organic polyisocyanate or polyisocyanates used in its preparation.

6. A process according to claim 5, characterized in that said composition comprises said isocyanate prepolymer component and up to a total of 30%, by weight, based on the isocyanate prepolymer component, of diprimary aromatic diamines within the molecular weight range of from 108 to 400; chain-lengthening agents carrying two blocked amino groups capable of being activated by moisture, selected from the group consisting of bis-aldimines, bis-ketimines, bis-enamines and bis-oxazolidines; or a combination of these materials.

* * * * *